United States Patent
Yoshida et al.

(10) Patent No.: US 11,044,370 B2
(45) Date of Patent: Jun. 22, 2021

(54) IMAGE PROCESSING APPARATUS AND IMAGE PROCESSING METHOD

(71) Applicant: CANON KABUSHIKI KAISHA, Tokyo (JP)

(72) Inventors: Teruyuki Yoshida, Kawasaki (JP); Norio Shimura, Yokohama (JP); Koji Yasuzaki, Tokorozawa (JP); Masaki Tanabe, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 16/397,301

(22) Filed: Apr. 29, 2019

(65) Prior Publication Data
US 2019/0356791 A1    Nov. 21, 2019

(30) Foreign Application Priority Data
May 17, 2018   (JP) .............................. JP2018-095636

(51) Int. Cl.
*H04N 1/00*    (2006.01)
*H04N 1/32*    (2006.01)

(52) U.S. Cl.
CPC ..... *H04N 1/00167* (2013.01); *H04N 1/00222* (2013.01); *H04N 1/32309* (2013.01)

(58) Field of Classification Search
USPC ............... 358/1.1–3.29, 1.11–1.18, 515–536, 358/426.01–426.08
See application file for complete search history.

(56) References Cited

U.S. PATENT DOCUMENTS

| | | | | |
|---|---|---|---|---|
| 6,179,409 B1* | 1/2001 | Takahashi | .............. | G06K 15/02 347/40 |
| 6,850,335 B1* | 2/2005 | Barry | .................... | G06F 3/1215 358/1.13 |
| 6,965,453 B1* | 11/2005 | Mori | ........................ | H04N 1/46 358/1.9 |

(Continued)

FOREIGN PATENT DOCUMENTS

| | | |
|---|---|---|
| JP | 2005-323159 | 11/2005 |
| JP | 6230258 B2 | 11/2017 |

OTHER PUBLICATIONS

Extended European Search Report dated Oct. 9, 2019 in counterpart EP Application 19170652.2.

*Primary Examiner* — Marcellus J Augustin
(74) *Attorney, Agent, or Firm* — Venable LLP

(57) ABSTRACT

A first processing module receives image data transferred from a controller, and executes image processing and a second processing module receives the image data transferred from the controller via the first processing module and executes image processing on the image data. The controller determines color components, of the plurality of color components of the image data, to be processed by the first processing module and the second processing module, based on at least communication amounts produced between the first processing module and the second processing module. Processed data having undergone the image processing performed by the first processing module based on the determined color components is transferred to the controller, and processed data having undergone the image processing performed by the second processing module based on the determined color components is transferred to the controller via the first processing module.

23 Claims, 9 Drawing Sheets

(56) References Cited

U.S. PATENT DOCUMENTS

| | | | |
|---|---|---|---|
| 2002/0082716 A1 | 6/2002 | Hashimoto et al. | 700/2 |
| 2003/0095272 A1* | 5/2003 | Nomizu | H04N 1/407 358/1.9 |
| 2005/0248584 A1 | 11/2005 | Takeo et al. | 345/603 |
| 2006/0082812 A1* | 4/2006 | Gardner | G06K 15/02 358/1.15 |
| 2006/0227369 A1* | 10/2006 | Lin | H04N 1/32443 358/1.15 |
| 2013/0159397 A1* | 6/2013 | Yamashita | G06F 9/5066 709/203 |
| 2014/0313546 A1 | 10/2014 | Fujita | G06F 3/1293 |
| 2016/0170688 A1* | 6/2016 | Komano | G06F 3/126 358/1.16 |
| 2016/0275380 A1* | 9/2016 | Hashii | G06K 15/105 |
| 2017/0075247 A1* | 3/2017 | Jinno | H04N 1/387 |
| 2017/0087823 A1* | 3/2017 | Nakamura | B41J 2/04541 |

\* cited by examiner

IMAGE PROCESSING APPARATUS AND IMAGE PROCESSING METHOD

BACKGROUND OF THE INVENTION

Field of the Invention

The present invention relates to an image processing apparatus and image processing method of executing image processing on image data.

Description of the Related Art

Conventionally, a method of performing distributed processing by connecting a plurality of processing units in series or parallel is a known method of increasing the speed of image processing. For example, in Japanese Patent No. 6230258, image data is converted into quantized data by using a plurality of image processors connected in series. Then, the quantized data generated by the image processors is transferred to engine chips equal in number to the image processors and similarly connected in series. Japanese Patent No. 6230258 discloses a technique which scalably changes the processing speed by changing the number of the image processors and engine chips thus connected in series.

On the other hand, Japanese Patent Laid-Open No. 2005-323159 discloses a technique by which a plurality of image processing modules having a PCIe interface can be connected via a PCIe switch, and, in order to improve the processing performance, a plurality of image processing modules having the same function are connected to the PCIe switch, thereby performing parallel processing.

In Japanese Patent No. 6230258, however, if the size of an input image increases, the memory usage and transfer time of a specific RAM increase. In addition, data lines equal in number to the image processors must be connected to a printer engine. Also, in Japanese Patent Laid-Open No. 2005-323159, the number of ports of the PCIe switch must be increased in accordance with the number of processing modules to be added. This increases the circuit scale and the number of terminals of the PCIe switch chip in proportion to the number of ports.

SUMMARY OF THE INVENTION

An aspect of the present invention is to eliminate the above-mentioned problems with the conventional technology. The present invention provides an image processing apparatus and image processing method of suppressing an increase in circuit scale in an arrangement including a plurality of processing modules.

The present invention in its first aspect provides an image processing apparatus comprising: a controller configured to transfer image data having a plurality of color components; a first processing module configured to receive the image data transferred from the controller, and execute image processing; and a second processing module configured to receive the image data transferred from the controller via the first processing module, and execute image processing on the image data, wherein the controller determines color components, of the plurality of color components of the image data, to be processed by the first processing module and the second processing module, based on at least communication amounts produced between the first processing module and the second processing module, processed data having undergone the image processing performed by the first processing module based on the determined color components is transferred to the controller, and processed data having undergone the image processing performed by the second processing module based on the determined color components is transferred to the controller via the first processing module.

The present invention in its second aspect provides an image processing apparatus comprising: a controller configured to transfer image data having a plurality of color components; a first processing module configured to receive the image data transferred from the controller, and execute image processing; and a second processing module configured to receive the image data transferred from the controller via the first processing module, and execute image processing on the image data, wherein processed data obtained by the first processing module by performing the image processing on the received image data is transferred to the controller, processed data obtained by the second processing module by performing the image processing on the image data received via the first processing module is transferred to the controller via the first processing module, and the number of color components as targets of the image processing to be executed by the first processing module is smaller than the number of color components as targets of the image processing to be executed by the second processing module.

The present invention in its third aspect provides an image processing method to be executed in an image processing apparatus comprising: a controller configured to transfer image data having a plurality of color components; a first processing module configured to receive the image data transferred from the controller, and execute image processing; and a second processing module configured to receive the image data transferred from the controller via the first processing module, and execute image processing on the image data, wherein the controller determines color components, of the plurality of color components of the image data, to be processed by the first processing module and the second processing module, based on at least communication amounts produced between the first processing module and the second processing module, processed data having undergone the image processing performed by the first processing module based on the determined color components is transferred to the controller, and processed data having undergone the image processing performed by the second processing module based on the determined color components is transferred to the controller via the first processing module.

The present invention in its fourth aspect provides an image processing method to be executed in an image processing apparatus comprising: a controller configured to transfer image data having a plurality of color components; a first processing module configured to receive the image data transferred from the controller, and execute image processing; and a second processing module configured to receive the image data transferred from the controller via the first processing module, and execute image processing on the image data, wherein processed data obtained by the first processing module by performing the image processing on the received image data is transferred to the controller, processed data obtained by the second processing module by performing the image processing on the image data received via the first processing module is transferred to the controller via the first processing module, and the number of color components as targets of the image processing to be executed by the first processing module is smaller than the number of color components as targets of the image processing to be executed by the second processing module.

The present invention can suppress an increase in circuit scale in an arrangement including a plurality of processing modules.

Further features of the present invention will become apparent from the following description of exemplary embodiments with reference to the attached drawings.

DESCRIPTION OF THE EMBODIMENTS

Figure 1:
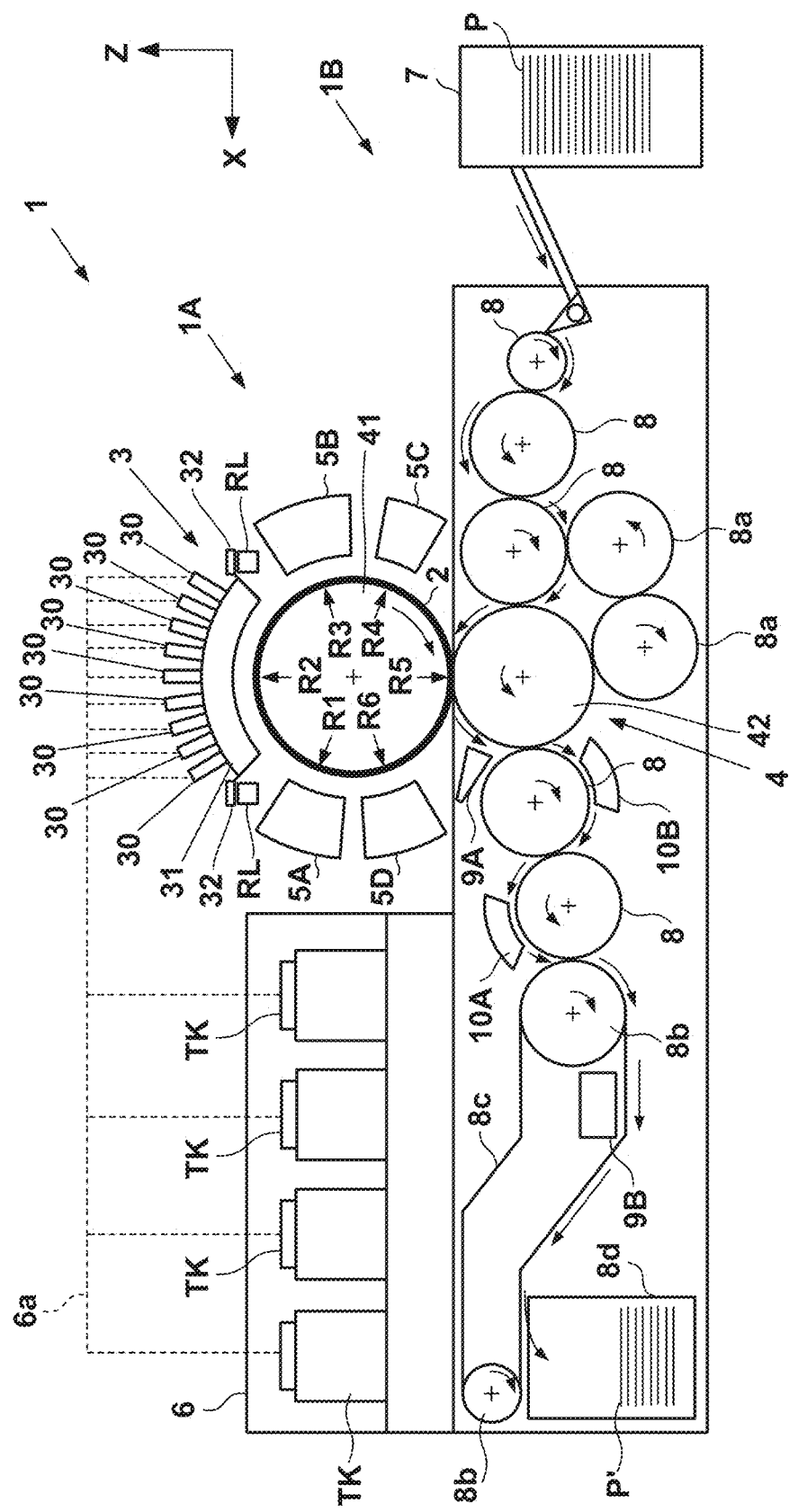
FIG. 1 is a view schematically showing a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

<Printing System>

FIG. 1 is a view schematically showing a printing system 1 according to an embodiment of the present invention. The printing system 1 is a sheet-fed inkjet printer (inkjet printing apparatus) for forming a printed product P' by transferring an ink image onto a printing medium P via a transfer member 2. The printing system 1 includes a printing apparatus 1A and a conveying apparatus 1B. In this embodiment, the X, Y, and Z directions respectively indicate the widthwise direction (total-length direction), the depth direction, and the height direction of the printing system 1. The printing medium P is conveyed in the X-direction. Note that in each of the following drawings, arrows X and Y indicate the horizontal directions and are perpendicular to each other. An arrow Z indicates the vertical direction.

Note also that "printing" includes not only a case in which meaningful information such as characters and figures is formed, but also a case in which images, designs, and patterns are formed on a printing medium, regardless of whether they are meaningful or meaningless, or a medium is processed. It does not matter whether or not information is visualized so that a human can visually perceive it. In addition, this embodiment assumes sheet-like paper as "the printing medium", but it is also possible to use, for example, a piece of cloth or a plastic film.

Ink components are not particularly limited. However, this embodiment assumes the use of aqueous pigment ink containing a pigment as a coloring material, water, and a resin.

<Printing Apparatus>

The printing apparatus 1A includes a printing unit 3, a transfer unit 4, peripheral units 5A to 5D, and a supply unit 6.

<Printing Unit>

Figure 2:
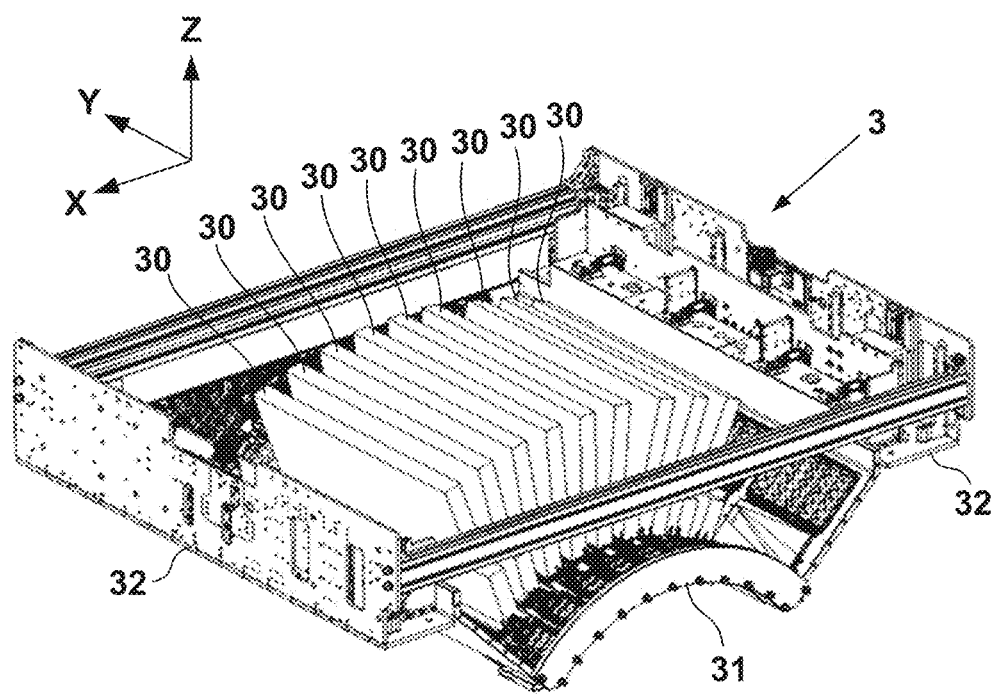
FIG. 2 is a perspective view of a printing unit.

The printing unit 3 includes a plurality of printheads 30 and a carriage 31. Reference figures are FIGS. 1 and 2. FIG. 2 is a perspective view of the printing unit 3. The printheads 30 discharge liquid ink onto a transfer member 2, thereby forming an ink image of a printing image on the transfer member 2.

In this embodiment, each printhead 30 is a full-line head extended in the Y direction, and nozzles are arranged in a range covering the width of an image printing area of a printing medium having a maximum usable size. The lower surface of the printhead 30 is an ink discharge surface in which nozzle holes are formed, and the ink discharge surface faces the surface of the transfer member 2 with a small gap (for example, a few mm) being formed between them. In this embodiment, the transfer member 2 cyclically moves on a circular orbit, so the plurality of printheads 30 are radially arranged.

Each nozzle has a discharging element. The discharging element is, for example, an element for discharging ink from the nozzle by generating a pressure in the nozzle, and the technique of an inkjet head of a well-known inkjet printer is applicable. Examples of the discharging element are an element that discharges ink by forming an air bubble by causing film boiling of ink by a thermoelectric converter, an element that discharges ink by an electromechanical converter, and an element that discharges ink by using static electricity. From the point of view of high-speed, high-density printing, a discharge unit using the electromechanical converter can be used.

This embodiment uses nine printheads 30. The nine printheads 30 discharge different types of ink. The different types of ink are, for example, ink components containing different coloring materials, and ink components such as yellow ink, magenta ink, cyan ink, and black ink. One printhead 30 discharges one type of ink, but one printhead 30 may also discharge different types of ink. When using the plurality of printheads 30 as described above, some printheads may also discharge ink containing no coloring material (for example, clear ink).

The carriage 31 supports the plurality of printheads 30. The end portion on the ink discharge surface side of each printhead 30 is fixed to the carriage 31. This makes it possible to precisely maintain the gap between the ink discharge surface and the surface of the transfer member 2. The carriage 31 is displaceable, with the printheads 30 being mounted on it, by being guided by guide members RL. In this embodiment, the guide member RL is a rail member extended in the Y direction, and a pair of guide members RL are formed apart in the X direction. A slide portion 32 is formed on each side portion of the carriage 31 in the X direction. The slide portions 32 engage with the guide members RL and slide in the Y direction along the guide members RL.

<Transfer Unit>

The transfer unit 4 will be explained with reference to FIG. 1. The transfer unit 4 includes a transfer cylinder 41 and an impression cylinder 42. Each cylinder is a rotary member that rotates around the rotational axis in the Y direction, and has a cylindrical outer circumferential surface. Referring to FIG. 1, an arrow shown in each of the transfer cylinder 41 and the impression cylinder 42 indicates the rotational direction. The transfer cylinder 41 rotates clockwise, and the impression cylinder 42 rotates counterclockwise.

The transfer cylinder 41 is a support member that supports the transfer member 2 on the outer circumferential surface. On the outer circumferential surface of the transfer cylinder 41, the transfer member 2 is continuously or intermittently formed in the circumferential direction. When continuously formed, the transfer member 2 is formed into an endless belt shape. When intermittently formed, the transfer member 2 is divided into a plurality of belt-like segments having ends. These segments can circularly be arranged at equal pitches on the outer circumferential surface of the transfer cylinder 41.

When the transfer cylinder 41 rotates, the transfer member 2 cyclically moves on the circular orbit. In accordance with the rotational phase of the transfer cylinder 41, the position of the transfer member 2 can be classified into a discharge pre-processing region R1, a discharge region R2, discharge post-processing regions R3 and R4, a transfer region R5, and a transfer post-processing region R6. The transfer member 2 cyclically passes through these regions.

The discharge pre-processing region R1 is a region where pre-processing is performed on the transfer member 2 before ink discharge by the printing unit 3, and is a region where the peripheral unit 5A performs processing. In this embodiment, a reaction solution is given. The discharge region R2 is a region where the printing unit 3 forms an ink image by discharging ink on the transfer member 2. The discharge post-processing regions R3 and R4 are processing regions where the ink image is processed after ink discharge. The discharge post-processing region R3 is a region where the peripheral unit 5B performs processing. The discharge post-processing region R4 is a region where the peripheral unit 5C performs processing. The transfer region R5 is a region where the ink image on the transfer member 2 is transferred onto the printing medium P by the transfer unit 4. The transfer post-processing region R6 is a region where post-processing is performed on the transfer member 2 after transfer, and is a region where the peripheral unit 5D performs processing.

In this embodiment, the discharge region R2 is a region having a predetermined zone. The zones of the regions R1 and R3 to R6 are narrower than the zone of the discharge region R2. In this embodiment, when compared with the face of a clock, the discharge pre-processing region R1 is at the position of about 10 o'clock, the discharge region R2 is within the range from about 11 o'clock to about 1 o'clock, the discharge post-processing region R3 is at the position of about 2 o'clock, and the discharge post-processing region R4 is at the position of about 4 o'clock. The transfer region R5 is at the position of about 6 o'clock, and the transfer post-processing region R6 is at the position of about 8 o'clock.

The transfer member 2 can be formed by a single layer, and can also be formed as a stack of a plurality of layers. When using a plurality of layers, for example, the transfer member 2 can include a surface layer, an elastic layer, and a compression layer. The surface layer is an outermost layer having an image formation surface on which an ink image is formed. When the compression layer is formed, the compression layer absorbs deformation and disperses a local pressure fluctuation. This makes it possible to maintain the transferability even during high-speed printing. The elastic layer is a layer between the surface layer and the compression layer.

As the material of the surface layer, various materials such as a resin and ceramic can suitably be used, and a material having a high compressive elastic modulus can be used in respect of the durability. Practical examples are an acrylic resin, an acrylic silicone resin, a fluorine-containing resin, and a condensate obtained by condensing a hydrolyzable organic silicon compound. A surface treatment can also be performed on the surface layer in order to improve the wettability to a reaction solution and the image transferability. Examples of the surface treatment are a flame treatment, a corona treatment, a plasma treatment, polishing, roughening, active energy ray irradiation, an ozone treatment, a surfactant treatment, and silane coupling. A plurality of treatments may be combined. It is also possible to form an arbitrary surface shape on the surface layer.

Examples of the material of the compression layer are acrylonitrile-butadiene rubber, acryl rubber, chloroprene rubber, urethane rubber, and silicone rubber. When molding a rubber material like this, it is possible to blend a predetermined amount of a vulcanizing agent or a vulcanization accelerator, and blend a filler such as a foaming agent, hollow fine particles, or salt as needed, thereby forming a porous rubber material. Consequently, bubble portions are compressed with a volume change against various pressure fluctuations, thereby decreasing deformation in the compressing direction. Accordingly, it is possible to obtain stabler transferability and durability. The porous rubber material can be classified into a continuous porous structure in which pores continue, and an independent porous structure in which pores are independent. It is possible to use either structure or use the both structures together.

As the material of the elastic layer, various materials such as a resin and ceramic can suitably be used. In respect of the processability, various elastomer materials and rubber materials can be used. Practical examples are fluoro silicone rubber, phenyl silicone rubber, fluorine rubber, chloroprene rubber, urethane rubber, and nitrile rubber. Other examples are ethylenepropylene rubber, natural rubber, styrene rubber, isoprene rubber, butadiene rubber, an ethylene/propylene/butadiene copolymer, and nitrile butadiene rubber. In particular, silicone rubber, fluoro silicone rubber, and phenyl silicone rubber have a small compression set and hence are advantageous in dimensional stability and durability. These rubber materials are also advantageous in transferability because a change in elastic modulus by the temperature is small.

Various adhesives and double-sided tapes can be used between the surface layer and the elastic layer and between the elastic layer and the compression layer in order to fix them. The transfer member 2 can also include a reinforcing layer having a high compression elastic modulus in order to suppress lateral elongation when attaching the transfer member 2 on the transfer cylinder 41 and to maintain the firmness. A woven fabric can be used as the reinforcing layer. The transfer member 2 can be manufactured by freely combining the layers made of the above-mentioned materials.

The outer circumferential surface of the impression cylinder 42 is urged against the transfer member 2. At least one grip mechanism for holding the leading edge of the printing medium P is formed on the outer circumferential surface of the impression cylinder 42. A plurality of grip mechanisms may also be formed apart in the circumferential direction of the impression cylinder 42. The printing medium P is conveyed in tight contact with the outer circumferential surface of the impression cylinder 42. When the printing medium P passes through a nip portion between the impression cylinder 42 and the transfer member 2, an ink image on the transfer member 2 is transferred onto the printing medium P.

<Peripheral Units>

The peripheral units 5A to 5D are arranged around the transfer member 2. In this embodiment, the peripheral units 5A to 5D are an application unit, an absorbing unit, a heating unit, and a cleaning unit in that order.

The application unit 5A is a mechanism that applies a reaction solution on the transfer member 2 before ink discharge by the printing unit 3. The reaction solution is a liquid containing a component that increases the viscosity of ink. "Increase the viscosity of ink" means that the color material or the resin forming the ink comes in contact with the viscosity-increasing component and chemically reacts with or physically adsorbs the component, thereby raising the viscosity of the ink. This increase in viscosity of ink includes not only a case in which the viscosity of the whole ink rises, but also a case in which a component such as the coloring material or the resin forming the ink partially flocculates and locally raises the viscosity.

The component that increases the viscosity of ink is not particularly limited, and examples are metal ions and a polymer flocculant. It is possible to use a substance that causes a pH change of ink and flocculates the coloring material in the ink, and an organic acid can be used. Examples of a reaction solution application mechanism are a roller, a printhead, a die coating apparatus (die coater), and a blade coating apparatus (blade coater). When the reaction solution is applied to the transfer member 2 before ink is discharged on the transfer member 2, the ink arriving at the transfer member 2 can immediately be fixed. This makes it possible to suppress bleeding that mixes adjacent ink components.

The absorbing unit 5B is a mechanism that absorbs a liquid component from an ink image on the transfer member 2. By reducing the liquid component of the ink image, a blur or the like of an image to be printed on the printing medium P can be suppressed. From a different viewpoint, this reduction in liquid component can also be expressed as condensing ink forming the ink image on the transfer member 2. "Condensing ink" means that the content of the solid components such as the coloring material and the resin contained in the ink increases with respect to the liquid component contained in the ink because the liquid component reduces.

The absorbing unit 5B includes a liquid absorbing member that comes in contact with an ink image and reduces the amount of liquid component of the ink image. The liquid absorbing member can be formed on the outer circumferential surface of the roller, and can also be formed into an endless sheet-like shape and cyclically moved. To protect an ink image, it is also possible to make the moving velocity of the liquid absorbing member and the peripheral speed of the transfer member 2 equal to each other and move the liquid absorbing member in synchronism with the transfer member 2.

The liquid absorbing member can contain a porous body that comes in contact with an ink image. To suppress adhesion of the ink solid components to the liquid absorbing member, the pore size of that surface of the porous body, which comes in contact with an ink image, can be 10 μm or less. The pore size is the average diameter and can be measured by well-known methods such as a mercury penetration method, a nitrogen adsorption method, and SEM image observation. Note that the liquid component is not particularly limited as long as it does not have any predetermined shape, has fluidity, and has an almost constant volume. Examples are water and an organic solvent contained in ink or the reaction solution.

The heating unit 5C is a mechanism that heats an ink image on the transfer member 2. When the ink image is heated, the resin in the ink image dissolves, and this improves the transferability to the printing medium P. The heating temperature can be a minimum filming temperature (MFT) of the resin or more. MFT can be measured by generally known methods, for example, devices complying with JIS K 6828-2:2003 and ISO2115:1996. From the viewpoint of the transferability and the image fastness, heating can be performed at a temperature higher by 10° C. or more than MFT, and can also be performed at a temperature higher by 20° C. or more than MFT. As the heating unit 5C, it is possible use well-known heating devices, for example, various lamps such as an infrared lamp and a hot air fan. An infrared heater can be used from the viewpoint of the heating efficiency.

The cleaning unit 5D is a mechanism that cleans the surface of the transfer member 2 after transfer. The cleaning unit 5D removes ink remaining on the transfer member 2 and dust and the like on the transfer member 2. As the cleaning unit 5D, it is possible to suitably use well-known methods such as a method of bringing a porous member into contact with the transfer member 2, a method of rubbing the surface of the transfer member 2 with a brush, and a method of scraping the surface of the transfer member 2 with a blade. Also, as a cleaning member to be used in cleaning, well-known shapes such as a roller shape and a web shape can be used.

As described above, this embodiment includes the application unit 5A, the absorbing unit 5B, the heating unit 5C, and the cleaning unit 5D as peripheral units. It is also possible to give a function of cooling the transfer member 2, or add a cooling unit, to some of these units. In this embodiment, the heat of the heating unit 5C sometimes raises the temperature of the transfer member 2. After the printing unit 3 discharges ink to the transfer member 2, if the ink image exceeds the boiling point of water as a main solvent of the ink, the liquid component absorbability of the absorbing unit 5B sometimes decreases. The liquid component absorbability can be maintained by cooling the transfer member 2 so that the discharged ink is kept lower than the boiling point of water.

The cooling unit can be a blowing mechanism that blows air to the transfer member 2, or a mechanism that brings a member (for example, a roller) into contact with the transfer member 2 and cools this member by air cooling or water cooling. The cooling unit may also be a mechanism that cools the cleaning member of the cleaning unit 5D. The cooling timing can be a period after transfer and before application of the reaction solution.

<Supply Unit>

The supply unit 6 is a mechanism for supplying ink to each printhead 30 of the printing unit 3. The supply unit 6 may also be installed at the back of the printing system 1. The supply unit 6 includes a storage unit TK for storing ink for each ink type. The storage unit TK can include a main tank and a sub tank. Each storage unit TK and each printhead 30 communicate with each other by a channel 6a, and the storage unit TK supplies ink to the printhead 30. The channel 6a may also be a channel that circulates ink between the storage unit TK and the printhead 30, and the supply unit 6 may also include a pump or the like for circulating ink. A deaerating mechanism for removing air bubbles from ink can be installed midway along the channel 6a or in the storage unit TK. A valve for adjusting the hydraulic pressure of ink and the atmospheric pressure can be installed midway along the channel 6a or in the storage unit TK. The heights of the storage unit TK and the printhead 30 in the Z direction can be so designed that the ink surface in the storage unit TK is lower than the ink discharge surface of the printhead 30.

<Conveying Apparatus>

The conveying apparatus 1B is an apparatus for supplying the printing medium P to the transfer unit 4, and discharging the printed product P' on which an ink image is transferred from the transfer unit 4. The conveying apparatus 1B includes a feed unit 7, a plurality of conveyance cylinders 8 and 8a, two sprockets 8b, a chain 8c, and a collection unit 8d. In FIG. 1, an arrow shown inside the figure of each part of the conveying apparatus 1B indicates the rotational direction of the part, and an arrow shown outside the figure of each part indicates the conveyance path of the printing medium P or the printed product P'. The printing medium P is conveyed from the feed unit 7 to the transfer unit 4, and the printed product P' is conveyed from the transfer unit 4 to the collection unit 8d. The side of the feed unit 7 will sometimes be called an upstream side in the conveyance direction, and the side of the collection unit 8d will sometimes be called a downstream side.

The feed unit 7 includes a stacking unit for stacking a plurality of printing media P, and a feeding mechanism for feeding the printing media P one by one from the stacking unit to the conveyance cylinder 8 on the most upstream side. Each of the conveyance cylinders 8 and 8a is a rotary member that rotates around the rotational axis in the Y direction, and has a cylindrical outer circumferential surface. At least one grip mechanism for holding the leading edge of the printing medium P (or the printed product P') is installed on the outer circumferential surface of each of the conveyance cylinders 8 and 8a. The gripping operation and the release operation of each grip mechanism are controlled so that the printing medium P is transferred between adjacent conveyance cylinders.

The two conveyance cylinders 8a are conveyance cylinders for reversing the printing medium P. When performing two-sided printing on the printing medium P, after transfer is performed on the obverse surface, the printing medium P is not transferred from the impression cylinder 42 to an adjacent conveyance cylinder 8 on the downstream side but transferred to the conveyance cylinder 8a. The printing medium P is turned over via the two conveyance cylinders 8a, and transferred to the impression cylinder 42 again via the conveyance cylinder 8 on the upstream side of the impression cylinder 42. Consequently, the reverse surface of the printing medium P comes in contact with the transfer cylinder 41, and an ink image is transferred onto the reverse surface.

The chain 8c is wound between the two sprockets 8b. One of the two sprockets 8b is a driving sprocket, and the other is a driven sprocket. When the driving sprocket rotates, the chain 8c cyclically moves. A plurality of grip mechanisms are arranged apart from each other in the longitudinal direction of the chain 8c. The grip mechanism grips the leading edge of the printed product P'. The printed product P' is transferred to the grip mechanism of the chain 8c from the conveyance cylinder 8 positioned on the downstream side, and the printed product P' gripped by the grip mechanism is conveyed to the collection unit 8d by the movement of the chain 8c, and released from the gripping. Accordingly, the printed product P' is stacked in the collection unit 8d.

<Post-Processing Unit>

The conveying apparatus 1B includes post-processing units 10A and 10B. The post-processing units 10A and 10B are mechanisms that are arranged downstream of the transfer unit 4, and perform post-processing on the printed product P'. The post-processing unit 10A performs processing on the obverse surface of the printed product P', and the post-processing unit 10B performs processing on the reverse surface of the printed product P'. An example of the processing contents is coating to be performed on the image printing surface of the printed product P' for the purposes of image protection, lustering, and the like. Examples of the contents of coating are application of a liquid, welding of a sheet, and lamination.

<Inspection Units>

The conveying apparatus 1B includes inspection units 9A and 9B. The inspection units 9A and 9B are mechanisms that are arranged downstream of the transfer unit 4 and perform inspection on the printed product P'.

In this embodiment, the inspection unit 9A is an imaging device for capturing an image printed on the printed product P', and includes an imaging element such as a CCD sensor or a CMOS sensor. The inspection unit 9A captures a printed image during a printing operation that is continuously performed. Based on the image captured by the inspection unit 9A, it is possible to check changes in colors and the like of the printed image with time, and determine whether to correct image data or printing data. In this embodiment, the imaging range of the inspection unit 9A is set on the outer circumferential surface of the impression cylinder 42, and the inspection unit 9A is so arranged as to be able to partially capture a printed image immediately after transfer. The inspection unit 9A can perform inspection on all printed images, and can also perform inspection on every predetermined number of images.

In this embodiment, the inspection unit 9B is also an imaging device for capturing an image printed on the printed product P', and includes an imaging element such as a CCD sensor or a CMOS sensor. The inspection unit 9B captures a printed image during a test printing operation. The inspection unit 9B captures the whole printed image, and the basic settings of various corrections related to printing data can be performed based on the image captured by the inspection unit 9B. In this embodiment, the inspection unit 9B is arranged in a position where the inspection unit 9B images the printed product P' conveyed by the chain 8c. When capturing a printed image by the inspection unit 9B, the movement of the chain 8c is temporarily stopped, and the whole image is captured. The inspection unit 9B may also be a scanner for scanning the surface of the printed product P'.

<Control Unit>

Figure 3:
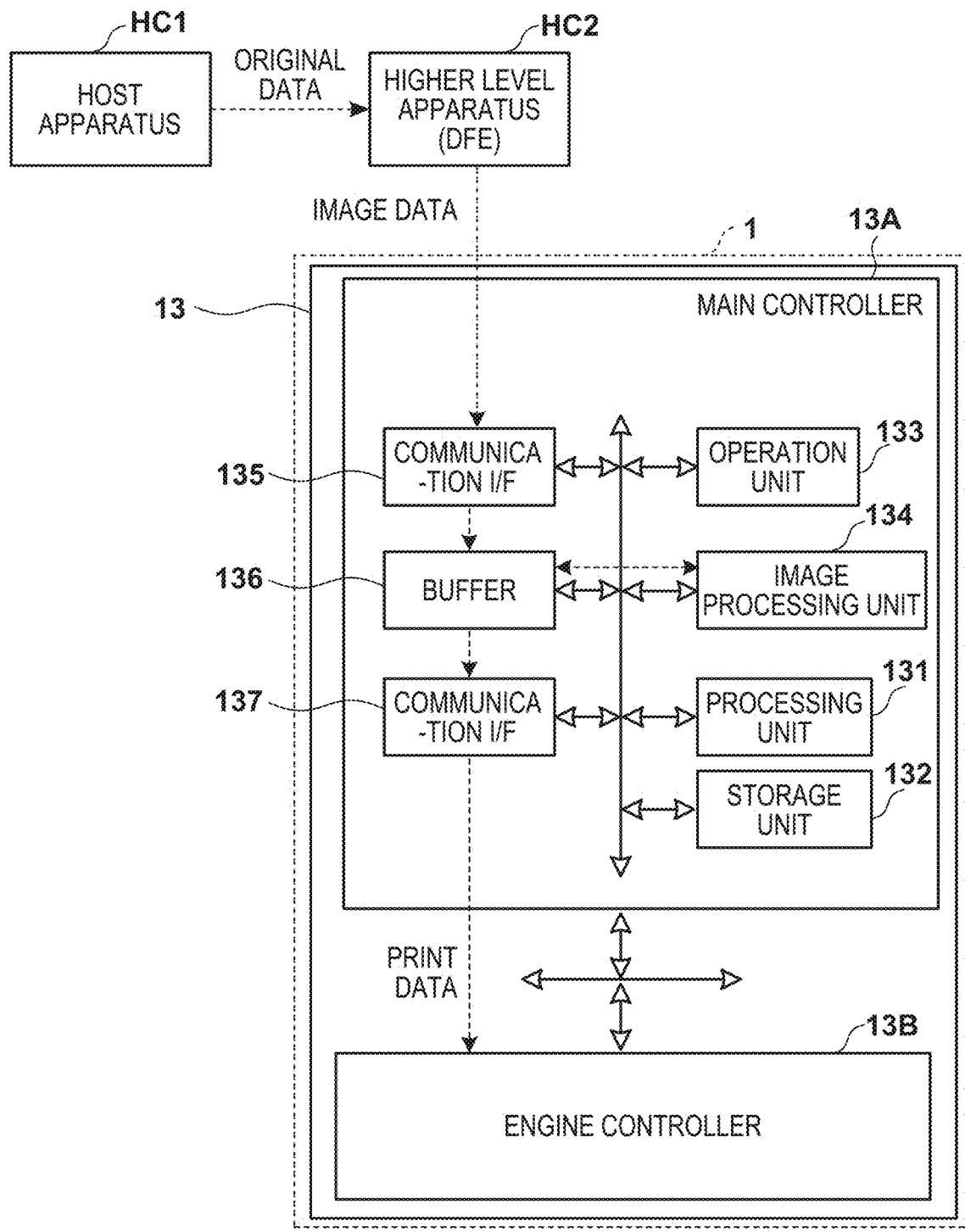
FIG. 3 is a view showing the block configuration of a control unit.

Next, a control unit of the printing system 1 will be explained. FIG. 3 is a block diagram of a control unit 13 of the printing system 1. The control unit 13 is communicably connected to a host apparatus (DFE) HC2, and the host apparatus HC2 is communicably connected to a host apparatus HC1.

The host apparatus HC1 generates or saves original data as the original of a printed image. This original data is generated by the format of an electronic file such as a document file or an image file. The original data is transmitted to the host apparatus HC2, and the host apparatus HC2 converts the received original data into a data format (for example, RGB data expressing an image by RGB) usable by the control unit 13. The host apparatus HC2 transmits the converted data as image data to the control unit 13, and the control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, and controls the whole main controller 13A by executing programs stored in the storage unit 132. The processing unit 131 will also be called a CPU 131 hereinafter. The storage unit 132 is a storage device such as a RAM, a ROM, a hard disk, or an SSD. The storage unit 132 stores programs to be executed by the CPU 131 and data, and provides a work area for the CPU 131. The operation unit 133 is an input device such as a touch panel, a keyboard, or a mouse, and accepts user's instructions.

The image processing unit 134 is a device including an image processor or the like. Details of the image processing unit 134 will be described later. The buffer 136 is, for example, a RAM, a hard disk, or an SSD. The communication I/F 135 communicates with the host apparatus HC2, and the communication I/F 137 communicates with the engine controller 13B. In FIG. 3, broken-line arrows exemplarily indicate the flow of image data processing. Image data received from the host apparatus HC2 via the communication I/F 135 is stored in the buffer 136. The image processing unit 134 reads out image data from the buffer 136, performs predetermined image processing on the read-out image data, and stores the processed image data in the buffer 136 again. This processed image data stored in the buffer 136 is transmitted as printing data to be used by the print engine from the communication I/F 137 to the engine controller 13B.

In this embodiment, the printing unit 3 includes the plurality of printheads 30. However, the printing unit 3 may also include one printhead 30. The printhead 30 need not be a full-line head, and it is also possible to use a serial method of forming an ink image while scanning the printhead 30 in the Y direction.

The conveying mechanism of the printing medium P may also be another method such as a method conveying the printing medium P by sandwiching it between a pair of rollers. In this method of conveying the printing medium P by using a pair of rollers, it is possible to use a roll sheet as the printing medium P, and form the printed product P' by cutting the roll sheet after transfer.

In this embodiment, the transfer member 2 is formed on the outer circumferential surface of the transfer cylinder 41. However, it is also possible to use another method such as a method of forming the transfer member 2 into the shape of an endless belt, and cyclically moving the transfer member 2.

Figure 4:
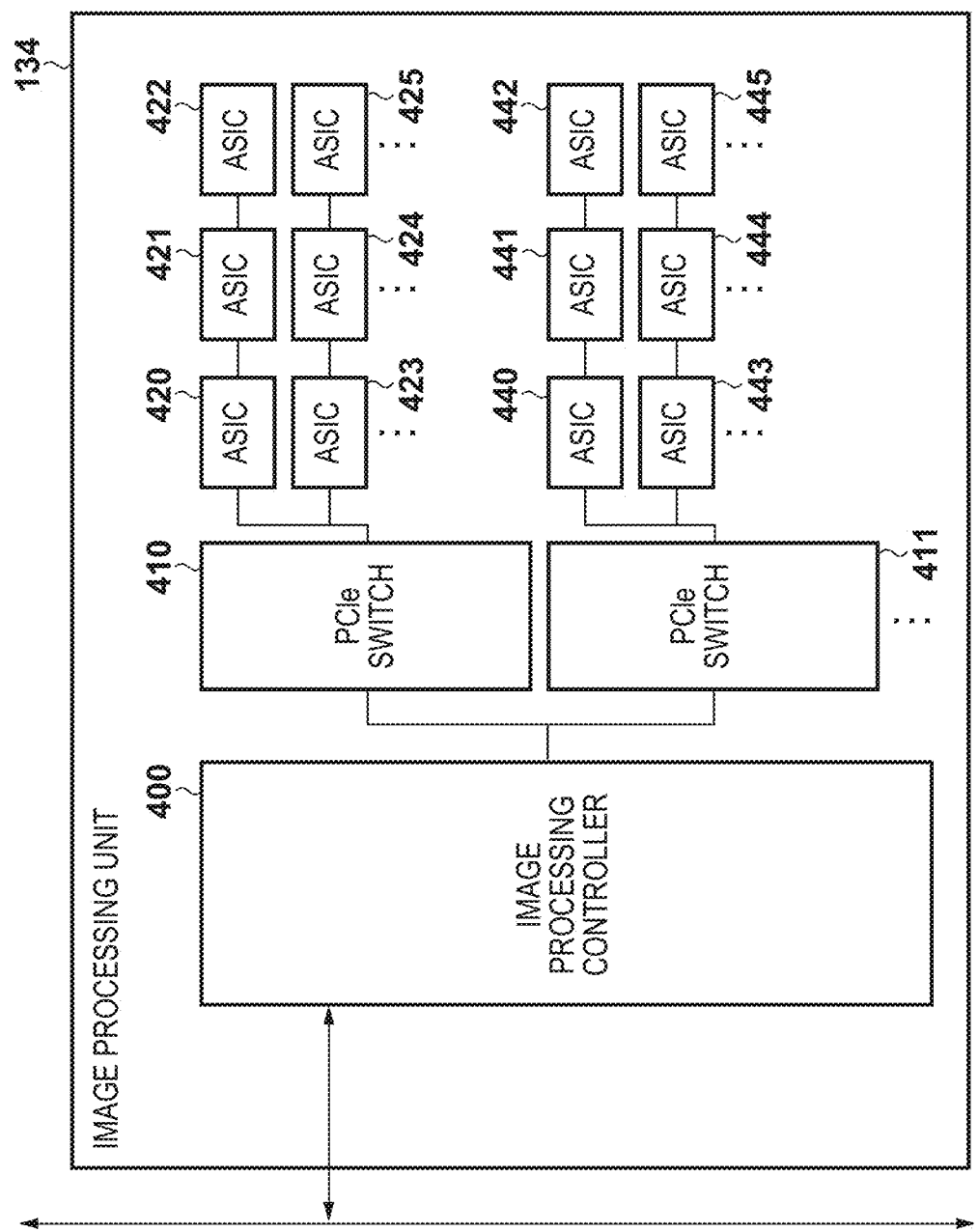
FIG. 4 is a view showing the module configuration of an image processing unit.

FIG. 4 is a module configuration view of the image processing unit 134. The image processing unit 134 includes an image processing controller 400, a PCIe switch 410, a PCIe switch 411, and a plurality of ASICs (420 to 445). To make the plurality of ASICs connectable to the image processing controller 400, the number of PCIe slots is increased by connecting the PCIe switches 410 and 411. The plurality of ASICs perform actual image processing. In this embodiment, all communications during image processing are PCIe communications. However, the present invention is not limited to this, and it is possible to adopt any arrangement meeting the performance, such as a USB or a LAN, instead of PCIe.

Figure 5:
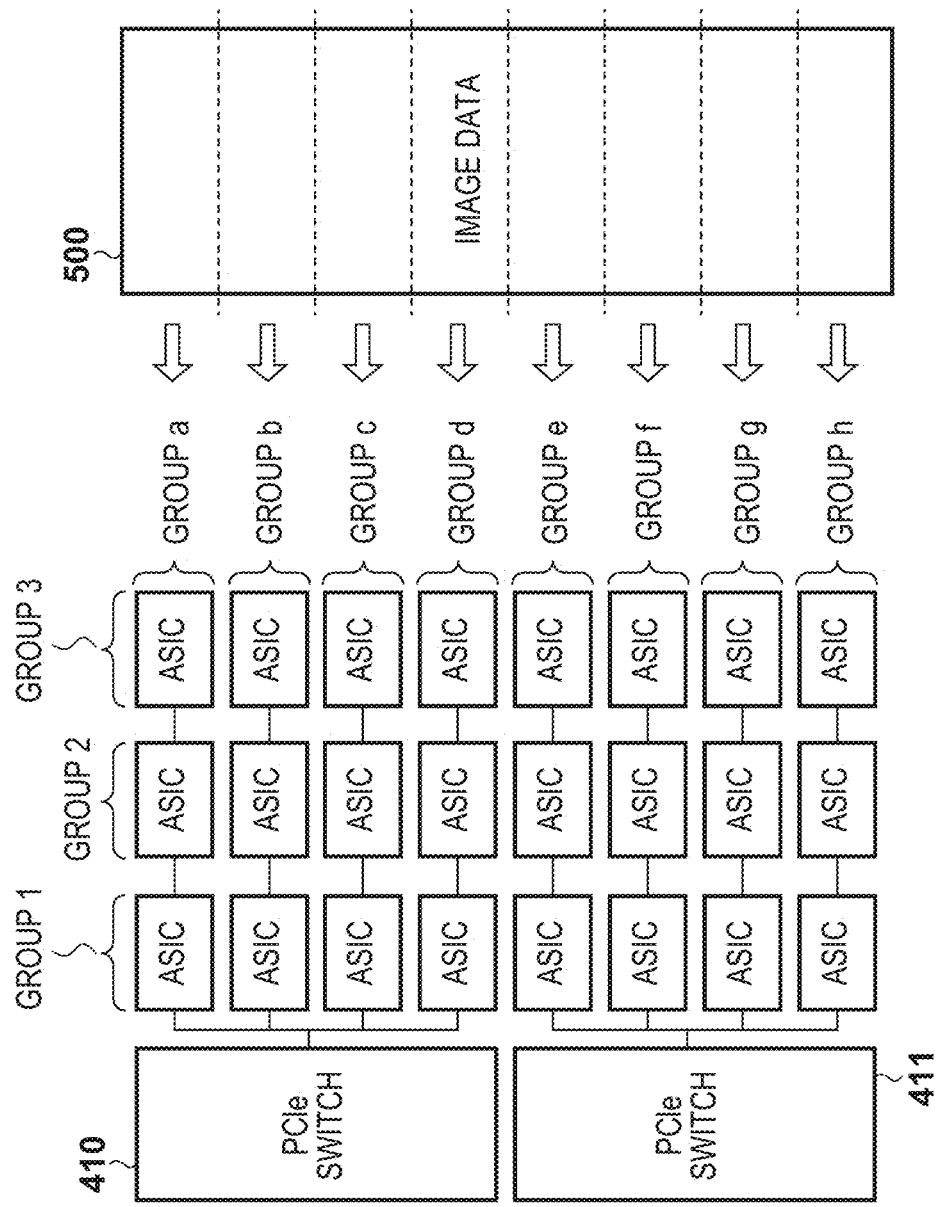
FIG. 5 is a view showing the group configuration of ASICs.

The way each ASIC performs image processing will be explained below with reference to FIG. 5. FIG. 5 is an ASIC group configuration view showing groups to which ASICs belong. Three ASICs are connected in series (groups 1 to 3), and eight series groups (groups a to h) are connected in parallel, thereby performing 8-parallel processing. ASICs belong to groups 1 to 3 in order from the one closest to the PCIe switch, and groups 1 to 3 process different color components. In this embodiment, the number of ASICs to be connected in series is 3, and the number of ASICs to be connected in parallel is 8. However, the present invention is not limited to these numbers, and any numbers can be used.

In this embodiment, image processing is performed by distributing image data 500 to the twenty-four ASICs. The image data 500 is divided into eight band regions, and groups a to h respectively process the eight band regions. The band regions are further divided into colors, and the ASICs belonging to groups 1 to 3 respectively perform image processing on predetermined color components.

Figure 6:
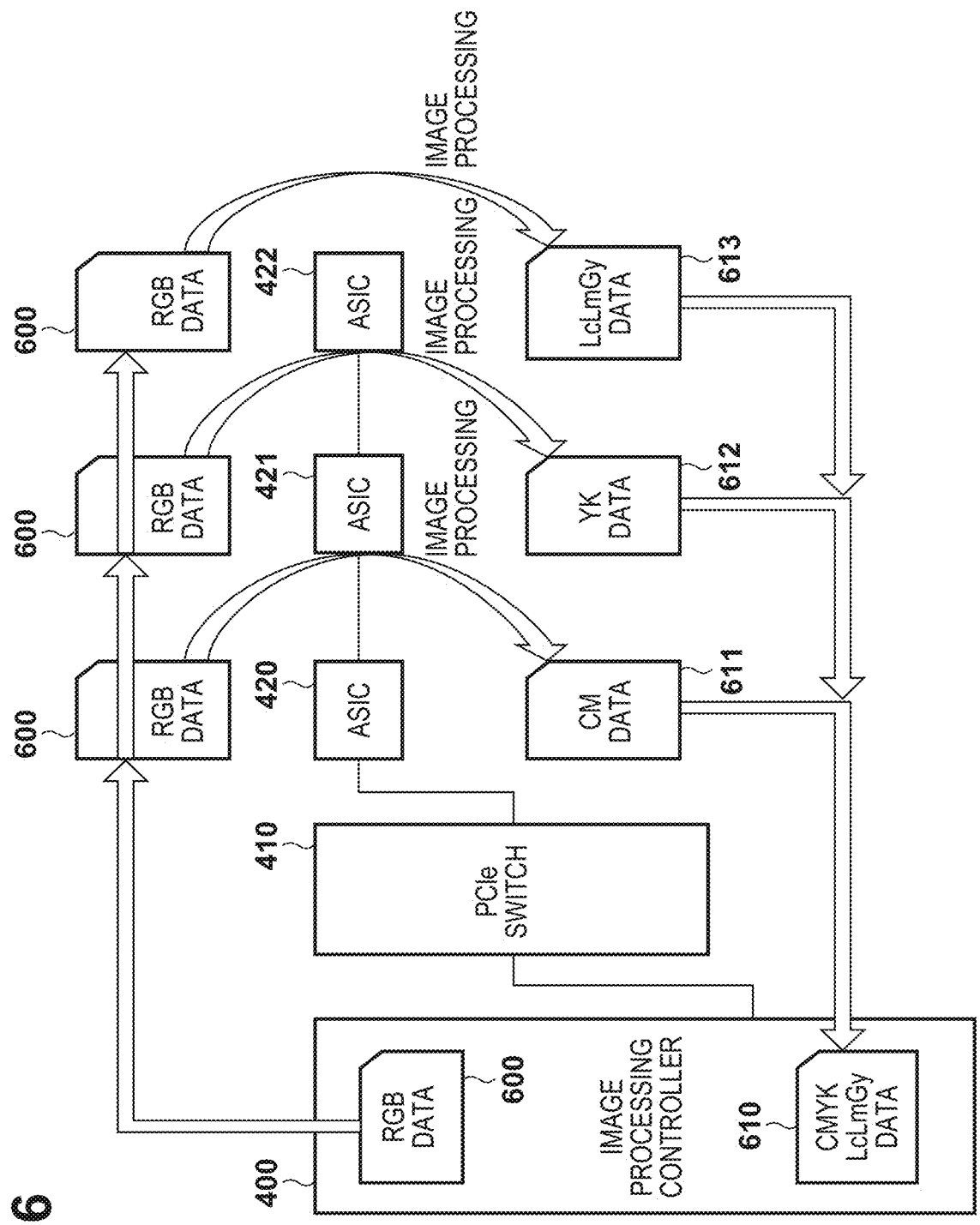
FIG. 6 is a view showing data flows between image processing modules.

FIG. 6 is a view showing the relationship between image data and processed data, and the data flow of the image processing modules (ASICs). This embodiment will be explained by assuming that the image data is RGB data, and the processed data is CMYKLcLmGy (C: Cyan, M: Magenta, Y: Yellow, B: Black, Lc: Light Cyan, Lm: Light Magenta, and Gy: Gray) data.

Transferred RGB data 600 is saved in the image processing controller 400. The saved RGB data 600 is transferred to the ASIC 420 via the PCIe switch 410. The ASIC 420 receives the RGB data 600 transferred from the image processing controller. Then, the ASIC 420 generates CM data 611 by performing image processing on the received RGB data 600, and transfers the received RGB data 600 to the ASIC 421. In addition, after completing the generation of the CM data 611, the ASIC 420 transfers the CM data 611 having undergone the image processing to the image processing controller 400 via the PCIe switch 410.

The ASIC 421 receives the RGB data 600 transferred from the ASIC 420. Then, the ASIC 421 generates YK data 612 by performing image processing on the received RGB data 600, and directly transfers the received RGB data 600 to the ASIC 422. In addition, after completing the generation of the YK data 612, the ASIC 421 transfers the YK data 612 having undergone the image processing to the ASIC 420. The ASIC 420 receives the YK data 612 transferred from the ASIC 421, and transfers the data to the image processing controller 400 via the PCIe switch 410.

The ASIC 422 receives the RGB data 600 transferred from the ASIC 421. Then, the ASIC 422 generates LcLmGy data 613 by performing image processing on the received RGB data 600. After completing the generation of the LcLmGy data 613, the ASIC 422 transfers the LcLmGy data 613 having undergone the image processing to the ASIC 421. The ASIC 421 receives the LcLmGy data 613 transferred from the ASIC 422, and directly transfers the data to the ASIC 420. The ASIC 420 transfers the LcLmGy data 613 transferred from the ASIC 421 to the image processing controller 400 via the PCIe switch 410. Then, the image processing controller 400 integrates the CM data 611, the YK data 612, and the LcLmGy data 613 transferred from the ASIC 420, thereby generating CMYKLcLmGy data 610.

The same RGB data is transmitted to the ASIC 420, the ASIC 421, and the ASIC 422 because these ASICs process different color components. Therefore, RGB data must be transmitted to these ASICs. For example, the ASIC 420 outputs two color components C and M, the ASIC 421 outputs two color components Y and B, and the ASIC 422 outputs three color components Lc, Lm, and Gy, that is, these ASICs output different color components.

Also, in this embodiment, the processed data having undergone the image processing in the ASIC 420, the ASIC 421, and the ASIC 422 are sequentially returned to the image processing controller 400 through the RGB data receiving path. The processed data are transferred to the engine controller including the printheads via the image processing controller 400. This makes it possible to reduce data lines and simplify the configuration, compared with a configuration in which each ASIC is directly connected to the engine controller including the printheads.

In this configuration, the ASIC 420 performs both the process of transferring the RGB data 600 not having undergone image processing to the ASIC 421 and the ASIC 422, and the process of transferring the data having undergone the image processing performed in the ASIC 421 and the ASIC 422. Accordingly, the ASIC 420 has the feature that the processing load such as the memory access amount becomes larger than those of the ASIC 421 and the ASIC 422. For the same reason, the ASIC 421 has the feature that the processing load becomes larger than that of the ASIC 422.

In this embodiment, therefore, the number of color components to be processed by ASIC having a large processing load is made smaller than the number of color components to be processed by ASIC having a small processing load. In the above example, the number of color components (two color components) to be processed by the ASIC 420 having a large processing load is made smaller than the number of color components (three color components) to be processed by the ASIC 422 having a small processing load. Note that in this embodiment, the image processing controller 400 transfers the RGB data 600, and the processed image data generated by each ASIC is returned to the image processing controller 400. In this configuration, therefore, the processing load of ASIC in the preceding stage (ASIC closer to the image processing controller 400 as a distance on the data path) typically increases because the data transfer amount is large. Also, the processing load of ASIC in the succeeding stage (ASIC farther from the image processing controller 400 as a distance on the data path) decreases because the data transfer amount is small. Accordingly, ASIC having the smallest data transfer amount is the ASIC 422 that has no succeeding ASIC as a transfer destination of the RGB data 600 and does not receive any processed image data.

In this embodiment, the ASIC 420, the ASIC 421, and the ASIC 422 are ASICs. However, the present invention is not particularly limited to ASIC, and it is also possible to use any module capable of image processing, such as FPGA or GPU. In addition, the colors to be processed by the ASIC 420, the ASIC 421, and the ASIC 422 are not limited to those explained above, and another color combination can be adopted. For example, it is also possible to process two color components C and B by the ASIC 420, two color components Y and M by the ASIC 421, and three color components Lm, Lc, and Gy by the ASIC 422. Furthermore, the colors to be contained in the processed data may also be colors other than CMYKLcLmGy.

In this embodiment, a total of three groups, that is, group 1, group 2, and group 3 perform parallel processing by dividing colors. This three-group configuration is based on a minimum configuration satisfying the image processing speed required as an image processing apparatus. Therefore, another number of groups such as a total of two groups or a total of four groups may also be adopted, provided that the required image processing speed is met.

Allocation methods that optimize the processing speed in relation to color division will be described below. The following three methods will be explained by assuming that there are a total of three groups, that is, group 1, group 2, and group 3. According to the following allocation methods, image processing can be performed more rapidly by changing the allocation of colors to be processed by ASICs. That is, the printing speed can be changed in accordance with the number of colors to be printed, for example, a standard printing speed is set for seven-color division, and a high printing speed is set for four-color division.

<Image Processing Color Allocation Method 1>

Figure 7:
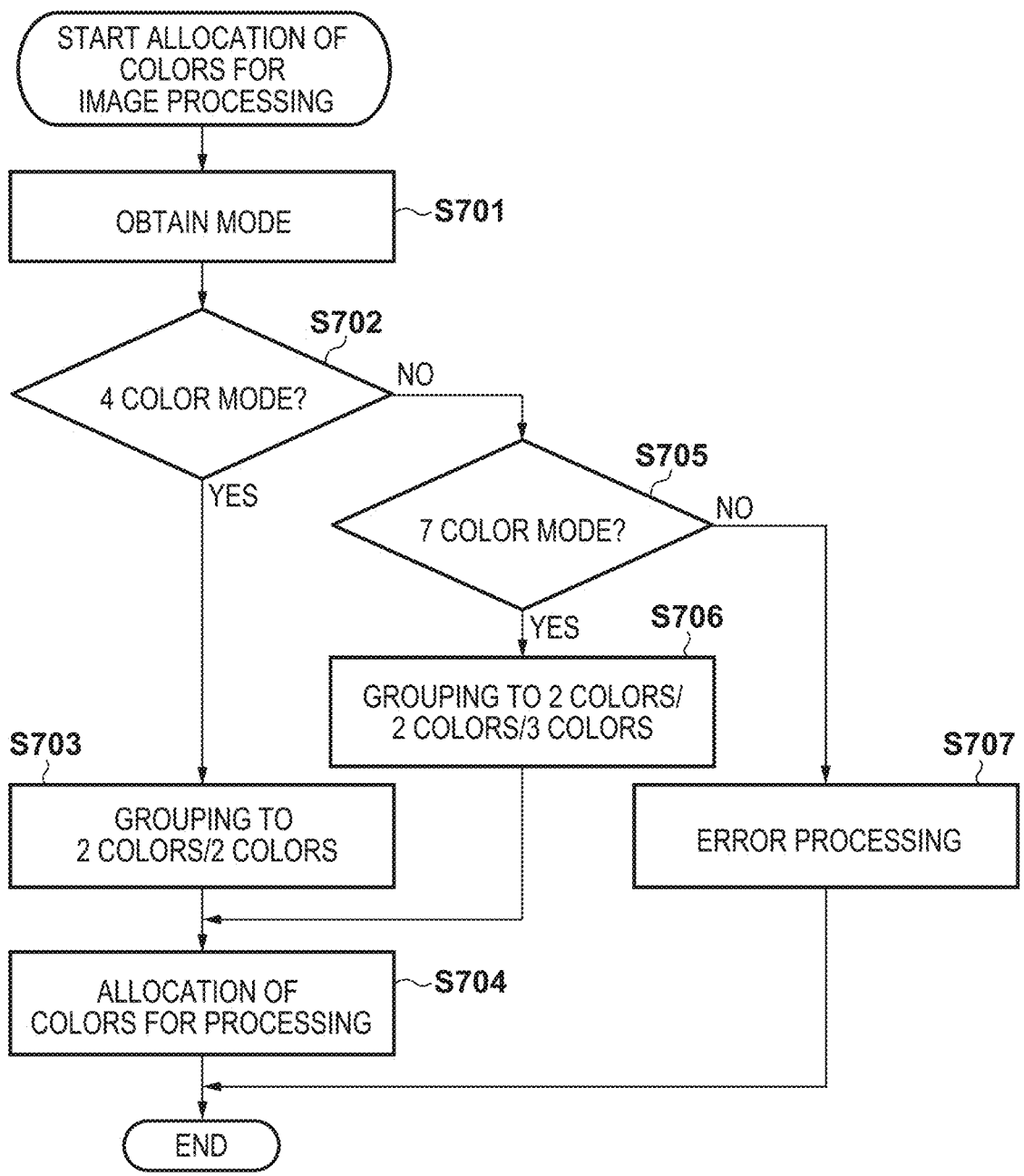
FIG. 7 is a flowchart showing a color allocation sequence.

FIG. 7 is a flowchart showing a color allocation sequence for determining the color component of an image to be generated by each ASIC, and determining a color group for performing processing based on a printing mode, in the data flow explained with reference to FIG. 6.

In step S701, the image processing controller 400 obtains a printing mode. This printing mode includes the printing conditions (printing settings) such as the number of printing colors and the sheet size. After obtaining the printing mode, the process advances to step S702, and the image processing controller 400 checks the number of colors in the printing mode.

In step S702, the image processing controller 400 determines whether the obtained printing mode is a mode (four-color printing mode) for performing four-color printing. If the printing mode is the four-color printing mode, the process advances to step S703, and the image processing controller 400 groups a total number of colors to be output into two colors and two colors. In step S704, the image processing controller 400 allocates two colors as the number of colors to be processed to the ASIC 420, and two colors as the number of colors to be processed to the ASIC 421. After that, the process shown in FIG. 7 is terminated, and image processing is executed.

On the other hand, if the printing mode obtained in step S701 is not the four-color printing mode, the process advances to step S705, and the image processing controller 400 determines whether the printing mode obtained in step S701 is a mode (seven-color printing mode) for performing seven-color printing. If the printing mode is the seven-color printing mode, the process advances to step S706, and the image processing controller 400 groups the total number of colors to be output into two colors, two colors, and three colors. Then, in step S704, the image processing controller 400 allocates two colors as the number of colors to be processed to the ASIC 420, two colors as the number of colors to be processed to the ASIC 421, and three colors as the number of colors to be processed to the ASIC 422. After that, the process shown in FIG. 7 is terminated, and image processing is executed.

On the other hand, if the printing mode obtained in step S701 is not the seven-color printing mode, the process advances to step S707, and the image processing controller 400 performs error processing. An example of the error processing is to display an error message on the user interface screen. After that, the process shown in FIG. 7 is terminated.

As for the allocation of the number of colors to be processed to ASIC in the four-color printing mode and the seven-color printing mode, it is favorable to previously validate and set a combination by which the load of each ASIC is not biased and the processing speed becomes shortest. As described above, when using the ASICs 420, 421, and 422, the ASIC 420 in the most preceding stage transfers the RGB data 600 to the ASIC 421, receives the data having undergone the image processing in the ASICs 421 and 422, and transfers the received data to the image processing controller 400, in addition to performing its own image processing. On the other hand, the ASIC 422 in the most succeeding stage performs its own image processing and transfers the data having undergone the image processing to the ASIC 421. That is, the processing load on the ASIC 422 is smaller than that on the ASIC 420. Therefore, in this embodiment as explained above with reference to FIG. 6, two color components are allocated as the number of color components to be processed to the ASIC 420, two color components are allocated as the number of color components to be processed to the ASIC 421, and three color components are allocated as the number of color components to be processed to the ASIC 422. This allocation can optimize the processing load and the processing time of each ASIC.

The number-of-color grouping method explained in this example groups colors into two colors and two colors in the four-color printing mode, and groups colors into two colors, two colors, and three colors in the seven-color printing mode. However, grouping can also be performed by using other numbers of colors. For example, in the four-color printing mode, grouping can be performed by allocating one color component to the ASIC 420, and three color components to the ASIC 421. In the seven-color printing mode, grouping can be performed by allocating one color component to the ASIC 420, three color components to the ASIC 421, and three color components to the ASIC 422. That is, the number of color components to be processed by ASIC in the final stage need only be larger than that to be processed by ASIC in the preceding stage. As color grouping combinations, optimum combinations are preferably preset in hardware.

<Image Processing Color Allocation Method 2>

In image processing color allocation method 1, the number of color components to be processed by each ASIC is a preset fixed value. In this example, a case in which this number is not a fixed value will be explained. The arrangement of this example is applicable to, for example, a case in which a color or the number of colors as a target of image processing is flexibly changeable, and a case in which the processing load changes from one color component to another.

Figure 8:
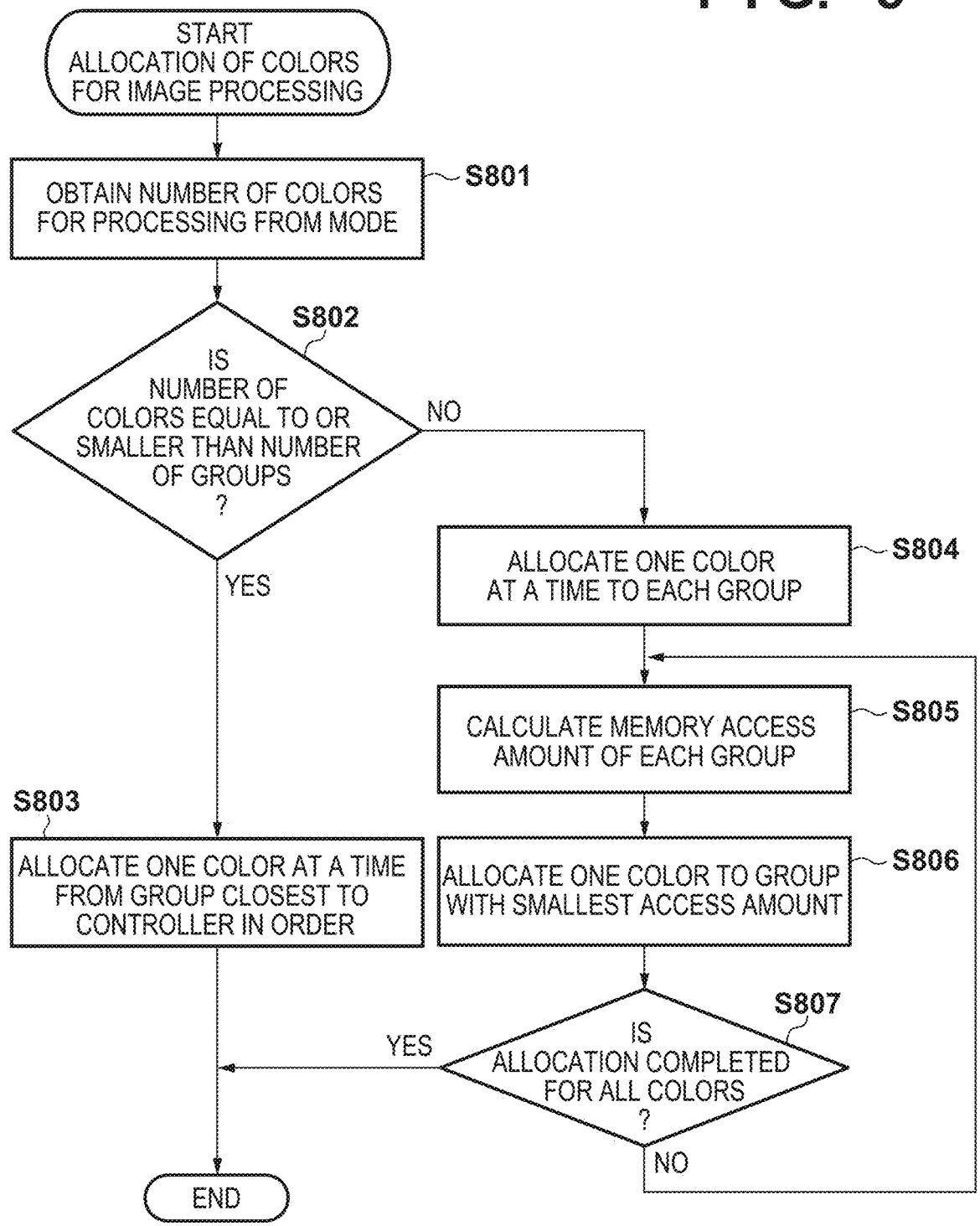
FIG. 8 is a flowchart showing a color allocation sequence.

FIG. 8 is a flowchart showing a color allocation sequence for determining the color component of an image to be generated by each ASIC, and determining a color group for performing processing based on a printing mode.

When starting execution of image processing, the image processing controller 400 starts allocation of color components as image processing targets, as shown in FIG. 8, with respect to group 1, group 2, and group 3. In step S801, the image processing controller 400 obtains the total number of color components as image processing targets from the printing mode. In step S802, the image processing controller 400 determines whether the obtained total number of color components is equal to or smaller than the number of groups. For example, if the total number of color components is CMY, that is, three or less, the process advances to step S803.

In step S803, the image processing controller 400 allocates color components to be processed one by one in order from group 1 closest to the image processing controller 400. In the case of CMY data, for example, the image processing controller 400 allocates the C component to group 1, the M component to group 2, and the Y component to group 3. After that, the process shown in FIG. 8 is terminated.

On the other hand, if the number of color components obtained in step S801 is four or more, that is, in the case of CMYK data, the process advances to step S804. In step S804, the image processing controller 400 allocates the C component to group 1, the M component to group 2, and the Y component to group 3. In step S805, the image processing controller 400 calculates the memory access amount in ASIC for each group, with the color component to be processed being allocated. In step S806, the image processing controller 400 allocates one remaining color to a group found to have the smallest memory access amount by the calculations in step S805. In this example, there is no group 4. Of group 1, group 2, and group 3, therefore, the data transfer amount of group 3 is smallest and as a result the memory access amount thereof is smallest. Accordingly, the remaining K component is allocated to group 3.

In step S807, the image processing controller 400 determines whether allocation to each group is performed for all the color components obtained in step S801. If allocation of all the color components is not complete, the process returns to step S805, and the image processing controller 400 calculates the memory access amount in ASIC for each group again. On the other hand, if allocation of all the color components to the groups is complete, the process shown in FIG. 8 is terminated.

The memory access amount is calculated from the sum total of the data size of the RGB data to be accessed in image processing, the data size of the processed data, the data size of the RGB data to be transmitted and received, and the data size of the processed data to be transmitted and received. The processed data is, for example, data converted by image processing into data having a CMYKLcLmGy color space.

In a high-quality-character mode, for example, only the K component of processed image data must be processed by doubling the number of processing bits (16 bits). In this case, when processing the K component and calculating data transfer allocation, optimum allocation can be performed by performing the calculation by doubling the memory access amount.

<Image Processing Color Allocation Method 3>

In image processing color allocation method 3, a color allocation method to be performed when the ASIC performance of each group is not constant.

Figure 9:
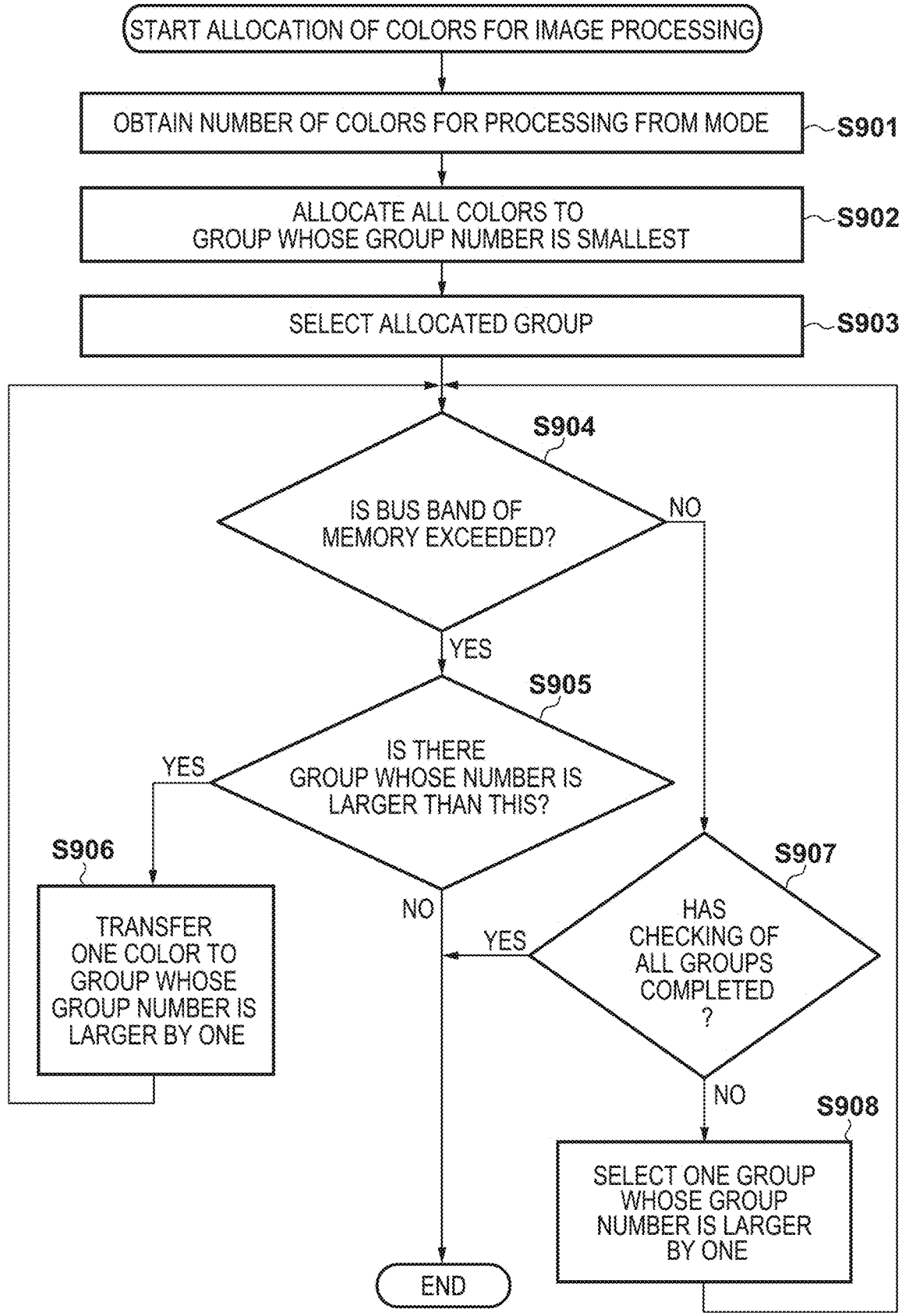
FIG. 9 is a flowchart showing a color allocation sequence.

FIG. 9 is a flowchart showing a color allocation sequence for determining the color component of an image to be generated by each ASIC, and determining a color group for performing processing based on a printing mode. When starting allocation of color components as image processing targets, the image processing controller 400 obtains the total number of color components as image processing targets from the printing mode in step S901. In step S902, the image processing controller 400 allocates all the color components obtained in step S901 to group 1. In step S903, the image processing controller 400 selects group 1.

In step S904, the image processing controller 400 calculates, for group 1, the memory bus band necessary for communication and image processing from the data size as an image processing target, and determines whether the calculated memory bus band exceeds the memory bus band of ASIC. The memory bus band may also be calculated as the transfer rate. If the memory bus band obtained by the calculation exceeds the bus band of ASIC, the process advances to step S905.

In step S905, the image processing controller 400 determines whether there is a group having a number larger than the selected group number. Since group 2 exists in this example, the process advances to step S906, and the image processing controller 400 transfers the allocation of one color component from group 1 to group 2. After that, the process returns to step S904. If the process returns from step S906 to step S904, in step S904, the image processing controller 400 recalculates, for selected group 1, the memory bus band necessary for communication and image processing from the data size as an image processing target, and determines whether the calculated memory bus band exceeds the memory bus band of ASIC.

If it is determined in step S904 that the memory bus band of ASIC is not exceeded, the process advances to step S907. In step S907, the image processing controller 400 determines whether all the groups are checked. For example, if only group 1 is checked and group 2 and group 3 are not checked, the process advances to step S908. In step S908, the image processing controller 400 selects a group having the next largest group number. For example, if only group 1 is checked, group 2 is selected, and the process returns to step S904. In step S904, the image processing controller 400 calculates, for group 2, the memory bus band necessary for communication and image processing from the data size as an image processing target, and determines whether the calculated memory bus band exceeds the memory bus band of ASIC.

On the other hand, if it is determined in step S907 that all the groups are checked, the process shown in FIG. 9 is terminated. For example, the processes in steps S904 to S908 are performed for the ASICs 420 to 422. If the process advances to step S907 with group 3 being selected, the process shown in FIG. 9 is terminated because there is no group 4.

In this embodiment as described above, the number of color components to be processed by each ASIC is determined based on the communication amounts between ASICs, as shown in the processes of FIGS. 7 to 9. Consequently, even when the size of data to be processed, for example, the size of RGB data increases, it is possible to prevent the processing load on a specific ASIC from being increased and biased. Also, as shown in FIG. 6, the image processing controller 400 is so configured as to sequentially transfer RGB data to the plurality of ASICs via the PCIe switch 410 and one of the plurality of ASICs. In addition, as shown in FIG. 6, the image processing controller 400 is so configured as to receive processed data via the PCIe switch 410 and one of the plurality of ASICs. In this configuration, data lines connected to the engine controller 13B need not be equal in number to ASICs, so an increase in circuit scale can be suppressed. Furthermore, even when the number of ASICs increases, the number of ports of the PCIe switch 410 for obtaining processed data need not be increased, so an increase in circuit scale can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095636, filed May 17, 2018, which is hereby incorporated by reference herein in its entirety.

What is claimed is:

1. An image processing apparatus comprising:
a controller configured to transfer image data;
a first region processing group including a first processing module and a second processing module connected in series with the first processing module, wherein the first processing module receives the image data transferred from the controller and the second processing module receives the image data transferred from the controller via the first processing module,
a second region processing group connected in parallel with the first region processing group for performing image processing on a region different from that of the first region processing group,
wherein the controller assigns image processing for a first color component to the first processing module and assigns image processing for a second color component different from the first color component to the second processing module connected with the first processing module in series, based on at least a processing amount of the first processing module and a processing amount of the second processing module,
processed data output from the first processing module after the image processing for the first color component performed on the image data by the first processing module is transferred to the controller, and
processed data output from the second processing module after the image processing for the second color component performed on the image data by the second processing module is transferred to the controller via the first processing module.

2. The apparatus according to claim 1, wherein the second region processing group includes a third processing module and a fourth processing module connected in series with the third processing modules.

3. The apparatus according to claim 1, wherein, in a case where the processing amount of the first processing module is larger than the processing amount of the second processing module, the controller performs the assignment such that the number of color components assigned to the second processing module is not less than the number of color components assigned to the first processing module.

4. The apparatus according to claim 1, wherein the first region processing group includes a plurality of processing modules including the first processing module and the second processing module, the image data is input to a processing module in a most preceding stage of the plurality of processing modules, and sequentially transferred to processing modules in succeeding stages.

5. The apparatus according to claim 4, wherein processed data output from a processing module in a last stage is transferred to the controller via the plurality of processing modules in preceding stages.

6. The apparatus according to claim 1, wherein the controller assigns the image processing for the first color component to the first processing module and assigns the image processing for the second color component to the second processing module, based on data transfer amount of the first processing module as the processing amount of the first processing module and data transfer amount of the second processing module as the processing amount of the second processing module.

7. The apparatus according to claim 1, wherein the controller allocates one color component to each of the first processing module and the second processing module, and further allocates other one color component to a processing module having a smaller communication amount with the one color component being already allocated.

8. The apparatus according to claim 1, wherein the controller assigns the image processing for the first color component to the first processing module and assigns the image processing for the second color component to the second processing module, based on a bus band of each of the first processing module and the second processing module.

9. The apparatus according to claim 1, wherein the first region processing group and the second region processing group perform image processing on a different band region from each other, and the first processing module and the second processing module perform image processing on the same band region of the image data.

10. The apparatus according to claim 1, wherein the image processing is a process of converting the image data from a first color space to a second color space.

11. The apparatus according to claim 10, wherein color components in the first color space include RGB, and color components in the second color space include CMYKLcLmGy.

12. The apparatus according to claim 1, further comprising a printing unit configured to print an image on a printing medium based on the processed data output by the controller.

13. The apparatus according to claim 1, wherein the first processing module and the second processing module are ASICs.

14. An image processing apparatus comprising:
a controller configured to transfer image data;
a first region processing group including a first processing module and a second processing module connected in series with the first processing module, wherein the first processing module receives the image data transferred from the controller and the second processing module receives the image data transferred from the controller via the first processing module,
a second region processing group connected in parallel with the first region processing group for performing image processing on a region different from that of the first region processing group,
wherein processed data output from the first processing module after image processing performed on the received image data by the first processing module is transferred to the controller,
processed data output from the second processing module after image processing performed on the image data received via the first processing module by the second processing module is transferred to the controller via the first processing module, and
the number of color components as targets of the image processing to be performed by the first processing module is smaller than the number of color components as targets of the image processing to be performed by the second processing module connected with the first processing module in series.

15. The apparatus according to claim 14, wherein the second region processing group includes a third processing module and a fourth processing module connected with the first processing modules in series.

16. The apparatus according to claim 14, wherein the first region processing group includes a plurality of processing modules including the first processing module and the second processing module,
the image data is input to a processing module in a most preceding stage of the plurality of processing modules, and sequentially transferred to processing modules in succeeding stages.

17. The apparatus according to claim 14, wherein processed data output from a processing module in a last stage is transferred to the controller via the plurality of processing modules in preceding stages.

18. The apparatus according to claim 14, wherein the controller assigns the image processing for the first color component to the first processing module and assigns the image processing for the second color component to the second processing module, based on data transfer amount of the first processing module as the processing amount of the first processing module and data transfer amount of the second processing module as the processing amount of the second processing module.

19. The apparatus according to claim 14, wherein the first region processing group and the second region processing group perform image processing on a different band region from each other, and the first processing module and the second processing module perform image processing on the same band region of the image data.

20. The apparatus according to claim 14, wherein the image processing is a process of converting the image data from a first color space to a second color space.

21. The apparatus according to claim 14, wherein color components in the first color space include RGB, and color components in the second color space include CMYKLcLmGy.

22. The apparatus according to claim 14, further comprising a printing unit configured to print an image on a printing medium based on the processed data output by the controller.

23. The apparatus according to claim 14, wherein the first processing module and the second processing module are ASICs.

* * * * *